United States Patent
Johnson, III et al.

(10) Patent No.: US 6,676,763 B2
(45) Date of Patent: Jan. 13, 2004

(54) METHOD AND APPARATUS FOR CLEANING AN OPTICAL FIBER

(75) Inventors: Arthur W. Johnson, III, Stoughton, MA (US); Harold G. Watts, Jr., Holden, MA (US); Anthony J. Christopher, Andover, MA (US); Andre Sharon, Newton Centre, MA (US); Frank Pretzch, Boston, MA (US); Mark S. Page, Merrimack, NH (US)

(73) Assignee: kSaira Corporation, Wilmington, MA (US)

( * ) Notice: Subject to any disclaimer, the term of this patent is extended or adjusted under 35 U.S.C. 154(b) by 240 days.

(21) Appl. No.: 09/900,534

(22) Filed: Jul. 6, 2001

(65) Prior Publication Data

US 2003/0005942 A1 Jan. 9, 2003

(51) Int. Cl.$^7$ .................................................. B08B 7/04
(52) U.S. Cl. ................................ 134/1; 134/10; 134/18; 134/34; 134/42; 134/56 R; 134/184
(58) Field of Search ................................ 134/1, 18, 10, 134/13, 26, 34, 113, 184, 201, 42, 147, 56 R, 58 R, 133, 200, 183

(56) References Cited

U.S. PATENT DOCUMENTS

| 3,768,143 A | | 10/1973 | Holmes, Jr. |
| 3,973,600 A | | 8/1976 | Choromokos |
| 4,336,047 A | | 6/1982 | Pavlopoulos et al. |
| 4,671,629 A | | 6/1987 | Doyle |
| 4,749,252 A | * | 6/1988 | Yanagi et al. ............... 385/96 |
| 4,916,811 A | | 4/1990 | Uehara et al. |
| 4,978,413 A | * | 12/1990 | Schotter ................... 156/446 |
| 5,526,833 A | * | 6/1996 | Crespel et al. ........... 134/102.1 |
| 5,770,001 A | | 6/1998 | Nagayama et al. |
| 5,926,594 A | | 7/1999 | Song et al. |
| 5,970,749 A | * | 10/1999 | Bloom ....................... 65/378 |
| 6,003,341 A | | 12/1999 | Bloom |
| 6,085,763 A | * | 7/2000 | Esmaeili et al. ........... 134/113 |
| 6,122,936 A | * | 9/2000 | Csipkes et al. .............. 65/485 |
| 6,237,370 B1 | | 5/2001 | Bloom |

FOREIGN PATENT DOCUMENTS

| DE | 2513680 A | * | 10/1975 | ........... C03C/15/00 |
| EP | 999460 A2 | * | 5/2000 | ........... G02B/6/25 |
| JP | 07155706 A | * | 6/1995 | ........... B08B/3/02 |
| JP | 2001137795 A | * | 5/2001 | ........... B08B/3/12 |
| JP | 2001149874 A | * | 6/2001 | ........... B08B/3/12 |

OTHER PUBLICATIONS

Ericsson Product Literature, 1998.

* cited by examiner

*Primary Examiner*—Alexander Markoff
(74) *Attorney, Agent, or Firm*—Wolf, Greenfield & Sacks, P.C.

(57) ABSTRACT

There is provided a method and apparatus for automatically cleaning a portion of an optical fiber. One embodiment of the apparatus comprises a fluid tank assembly that holds cleaning fluid and comprises an aperture sized and arranged to receive the portion of the optical fiber, an ultrasonic generator, a clamping assembly, and a controller. The clamping assembly, in one position, holds the portion of the optical fiber in a position that is axially aligned with the aperture of the fluid tank assembly and disposed through the aperture of the fluid tank assembly. The clamping assembly further comprises a sealing assembly that forms a fluid seal about the portion of the optical fiber and a fluid seal of the aperture of the fluid tank assembly. The controller controls the ultrasonic generator to provide an ultrasonic signal to the fluid within the fluid tank assembly to clean the portion of the optical fiber.

48 Claims, 8 Drawing Sheets

METHOD AND APPARATUS FOR CLEANING AN OPTICAL FIBER

FIELD OF THE INVENTION

The present invention relates to a device for cleaning an optical fiber and, in particular, to an automated device for ultrasonically cleaning an optical fiber.

DESCRIPTION OF THE RELATED ART

Optical devices are becoming increasingly popular, particularly for use in networking applications. In an optical network or other circuit, optical devices are interconnected via optical fiber which serves as the transmission medium for transmitting information between the devices. Similarly, an optical device is often made up of multiple different components that are interconnected, internally within the device, by optical fibers.

One conventional technique for interconnecting multiple optical components within a device is through the use of a pigtail. A pigtail is essentially a length of optical fiber that includes a type of connector referred to as a ferrule attached to the optical fiber at each of its ends. The ferrules provide some structural support to the optical fiber making it easier to handle and to connect directly with optical components or other optical fibers. Conventionally, pigtails are formed by unwinding the desired length of optical fiber from a large spool of optical fiber, cutting the optical fiber to the desired length, winding the optical fiber to facilitate handling of the fiber in a more compact area, stripping a protective coating away from the optical fiber at the ends of the optical fiber, cleaning the stripped ends of the optical fiber, cleaving the ends of the optical fiber, and attaching the ferrules to one or both ends, with all of these processes conventionally being done by hand.

One method of cleaning a stripped end of the optical fiber is to place some alcohol on a material, such as, a cloth or a cotton swap, and wipe the stripped end of the optical fiber by hand with the alcohol soaked material. There are several disadvantages to this method. For example, the fiber is not always cleaned to a degree desired where the person wiping the end of the optical fiber may leave streaks or may not uniformly clean the end of the fiber. In addition, this method may result in some damage to the optical fiber where the person cleaning the fiber is not careful or exerts too much pressure when cleaning the fiber with the cloth. Also, this method may not be effective for cleaning ribbon fibers with particles of dirt trapped between the fibers. Further, this method is manual and therefore is limited to the speed of the person using the method.

Another method and apparatus for cleaning optical fibers is an ultrasonic bath assembly, such as, the EUC-12 Ultrasonic cleaner sold by Ericsson Cables AB of Stockholm, Sweden. Referring to FIG. 11, there is illustrated a perspective view of the related art ultrasonic cleaner. This ultrasonic device 102 includes a small bath 104 that may be used to hold a cleaning fluid, such as, pure ethanol, pure 2-propanol or alcohol, which can be used to clean the end of the optical fiber. In addition, this device has an aperture (not illustrated) in a top of the bath that mates with a fiber holding unit 106. The bath can be filled with cleaning fluid and the fiber holding unit can be coupled to the bath so as to cover the aperture in the bath. An end of an optical fiber may be placed in a fiber holder 108 that mates with the fiber holding unit, so that the fiber may be inserted into the aperture through the top of the bath to submerge the end of the optical fiber in the cleaning fluid. The ultrasonic cleaning device includes an ultrasonic transducer (not illustrated) that provides ultrasonic waves to the cleaning fluid within the bath including the submerged end of the optical fiber, to clean the end of the fiber. The cleaning device is manually turned on by pressing a start/stop button 110 and after the cleaning has completed, it is turned off. The cleaner device may also include a temperature sensor that senses a temperature of the cleaning fluid and that is coupled to the ultrasonic generator. With this arrangement, if the temperature of the alcohol exceeds a threshold temperature, the ultrasonic generator may be turned off to prevent ignition of the cleaning fluid.

However, the cleaning device of the related art has several disadvantages. The process of placing the fiber into the fixture holder and into the fiber holding unit, turning on the ultrasonic generator and removing the fiber from the cleaner is manual, and therefore is limited by the accuracy and speed of the person cleaning the fiber. In addition, alcohol is typically used as the fluid to clean the fiber. However, as the ultrasonic transducer agitates the alcohol, a typical result is a heating of the alcohol by agitation of the alcohol. This can be problematic, for example, because alcohol has a low flash point, and therefore it is possible that there can be ignition of the alcohol and subsequent burning of the cleaning device and the fiber. Accordingly, the device cannot be used at a high frequency or high throughput rate, because the temperature sensor may stop the ultrasonic transducer as the alcohol exceeds a certain temperature threshold.

One embodiment of the invention is directed to a cleaning device and in particular an automated, ultrasonic cleaning device.

SUMMARY OF THE INVENTION

According to one illustrated embodiment, an automated cleaning device for cleaning a portion of an optical fiber comprises a fluid tank assembly, an ultrasonic generator, a clamping assembly, and a controller. The fluid tank assembly comprises an aperture sized and arranged to receive the portion of the optical fiber. The ultrasonic generator is mechanically coupled to the fluid tank assembly and, in response to a control signal, provides an ultrasonic signal to the fluid within the fluid tank assembly. The clamping assembly is adapted for holding the portion of the optical fiber along a clamping axis that is axially aligned with the aperture of the fluid tank assembly, and is constructed and arranged to hold the portion of the optical fiber such that the portion of the optical fiber is disposed through the aperture of the fluid tank assembly and is disposed within the fluid tank assembly. The clamping assembly also comprises a sealing assembly constructed and arranged to form a fluid seal about the optical fiber and form a fluid seal of the aperture of the fluid tank assembly. The controller provides the control signal. The cleaning device further comprises a sensor mechanically coupled to the aperture of the fluid tank assembly, that senses a sealed condition for which the clamping assembly is in fluid seal engagement with the aperture of the fluid tank assembly.

According to one illustrated embodiment, an automated cleaning device for cleaning a portion of an optical fiber comprises a fluid tank assembly, an ultrasonic generator, a clamping assembly, and a controller. The fluid tank assembly comprises an aperture sized and arranged to receive the portion of the optical fiber. The ultrasonic generator is mechanically coupled to the fluid tank assembly and, in response to a control signal, provides an ultrasonic signal to the fluid within the fluid tank assembly. The clamping assembly is adapted for holding the portion of the optical fiber along a clamping axis that is axially aligned with the aperture of the fluid tank assembly, and is constructed and arranged to hold the portion of the optical fiber such that the portion of the optical fiber is disposed through the aperture of the fluid tank assembly and is disposed within the fluid tank assembly. The clamping assembly also comprises a sealing assembly constructed and arranged to form a fluid seal about the optical fiber and form a fluid seal of the aperture of the fluid tank assembly. The controller provides the control signal. The cleaning device further comprises an actuator mechanically coupled to the fluid tank assembly, that is adapted to move the fluid tank assembly.

According to one illustrated embodiment, an automated cleaning device for cleaning a portion of an optical fiber comprises a fluid tank assembly, an ultrasonic generator, a clamping assembly, and a controller. The fluid tank assembly comprises an aperture sized and arranged to receive the portion of the optical fiber. The ultrasonic generator is mechanically coupled to the fluid tank assembly and, in response to a control signal, provides an ultrasonic signal to the fluid within the fluid tank assembly. The clamping assembly is adapted for holding the portion of the optical fiber along a clamping axis that is axially aligned with the aperture of the fluid tank assembly, and is constructed and arranged to hold the portion of the optical fiber such that the portion of the optical fiber is disposed through the aperture of the fluid tank assembly and is disposed within the fluid tank assembly. The clamping assembly also comprises a sealing assembly constructed and arranged to form a fluid seal about the optical fiber and form a fluid seal of the aperture of the fluid tank assembly. The controller provides the control signal. The cleaning device further comprises a servo assembly mechanically coupled clamping assembly and that is adapted to move the clamping assembly along the clamping axis.

According to one illustrated embodiment, an automated cleaning device for cleaning a portion of an optical fiber comprises a fluid tank assembly, an ultrasonic generator, a clamping assembly, and a controller. The fluid tank assembly comprises an aperture sized and arranged to receive the portion of the optical fiber. The ultrasonic generator is mechanically coupled to the fluid tank assembly and, in response a control signal, provides an ultrasonic signal to the fluid within the fluid tank assembly. The clamping assembly is adapted for holding the portion of the optical fiber along a clamping axis that is axially aligned with the aperture of the fluid tank assembly, and is constructed and arranged to hold the portion of the optical fiber such that the portion of the optical fiber is disposed through the aperture of the fluid tank assembly and is disposed within the fluid tank assembly. The clamping assembly also comprises a sealing assembly constructed and arranged to form a fluid seal about the optical fiber and form a fluid seal of the aperture of the fluid tank assembly. The controller provides the control signal. The cleaning device further comprises a first fluid level sensor electrically coupled to the controller, that senses a level of the cleaning fluid in the fluid tank assembly.

According to one illustrated embodiment, an automated cleaning device for cleaning a portion of an optical fiber comprises a fluid tank assembly, an ultrasonic generator, a clamping assembly, and a controller. The fluid tank assembly comprises an aperture sized and arranged to receive the portion of the optical fiber. The ultrasonic generator is mechanically coupled to the fluid tank assembly and, in response to a control signal, provides an ultrasonic signal to the fluid within the fluid tank assembly. The clamping assembly is adapted for holding the portion of the optical fiber along a clamping axis that is axially aligned with the aperture of the fluid tank assembly, and is constructed and arranged to hold the portion of the optical fiber such that the portion of the optical fiber is disposed through the aperture of the fluid tank assembly and is disposed within the fluid tank assembly. The clamping assembly also comprises a sealing assembly constructed and arranged to form a fluid seal about the optical fiber and form a fluid seal of the aperture of the fluid tank assembly. The controller provides the control signal. The cleaning device further comprises first and second clamping arms rotatably supported by a base such that the first and second clamping arms can move between an open position and a closed position that holds the optical fiber along the clamping axis.

According to one illustrated embodiment, an automated cleaning device for cleaning a portion of an optical fiber comprises a fluid tank assembly, an ultrasonic generator, a clamping assembly, and a controller. The fluid tank assembly comprises an aperture sized and arranged to receive the portion of the optical fiber. The ultrasonic generator is mechanically coupled to the fluid tank assembly and, in response to a control signal, provides an ultrasonic signal to the fluid within the fluid tank assembly. The clamping assembly is adapted for holding the portion of the optical fiber along a clamping axis that is axially aligned with the aperture of the fluid tank assembly, and is constructed and arranged to hold the portion of the optical fiber such that the portion of the optical fiber is disposed through the aperture of the fluid tank assembly and is disposed within the fluid tank assembly. The clamping assembly also comprises a sealing assembly constructed and arranged to form a fluid seal about the optical fiber and form a fluid seal of the aperture of the fluid tank assembly. The controller provides the control signal. The cleaning device further comprises a fluid reservoir assembly that stores the cleaning fluid and a pump fluidly coupled to the fluid reservoir assembly and to the fluid tank assembly. The pump is constructed and arranged to pump the cleaning fluid from the fluid reservoir assembly to the fluid tank assembly.

According to one illustrated embodiment, a method for cleaning a portion of an optical fiber comprises provided a fluid tank assembly that holds a cleaning fluid and that comprises an aperture sized and arranged to receive the portion of the optical fiber. Holding the portion of the optical fiber along a clamping axis that is axially aligned with the aperture of the fluid tank assembly so that the portion of the optical fiber is disposed through the aperture of the fluid tank assembly and is disposed within the fluid tank assembly. The method further comprises forming a fluid seal about the portion of the optical fiber and of the aperture of the fluid tank assembly. The method further comprises determining a sealed condition of the fluid seal of the aperture of the fluid tank assembly, and providing an ultrasonic signal to the fluid within the fluid tank assembly to clean the portion of the optical fiber.

BRIEF DESCRIPTION OF THE DRAWINGS

Other objects and features of the present invention will become apparent from the following detailed description when taken in connection with the following drawings. It is to be understood that the drawings are for the purpose of illustration only and are not intended as a definition of the limits of the invention.

The foregoing and other objects and advantages will be more fully appreciated from the following drawing in which.

DETAILED DESCRIPTION

For purposes of illustration, at least one exemplary embodiment in aspects thereof will now be described in detail with reference to the accompanying Figs. It is to be appreciated that any invention is not limited to specific embodiments disclosed herein and shall be defined by the claims and any equivalent of each element of the claims. It is also to be appreciated that like elements may be disclosed in different Figs. and may not be described in detail with reference to each Fig., and may also be illustrated by the same or different reference numbers in different Figs.

The present invention is directed to a device for cleaning a portion of an optical fiber. In particular, the present invention is directed to an automated cleaning device that automatically captures an optical fiber and places an end of the optical fiber within a fluid tank assembly cleaning the end of the optical fiber. According to one aspect of the cleaning device, the clamping assembly and the cleaning device may be configured for use with optical fibers having any outer diameter from approximately 180 microns to approximately 900 microns. However, it is to be appreciated that the clamping assembly and the cleaning device of the invention can be used for cleaning the plurality of components including an optical fiber, an end of a stripped, solid or stranded wire, cable including, for example, a coaxial cable, a communications cable including a plurality of twisted pairs having an outer jacket and a protective coating on the twisted pairs stripped away, and the like.

Figure 1:
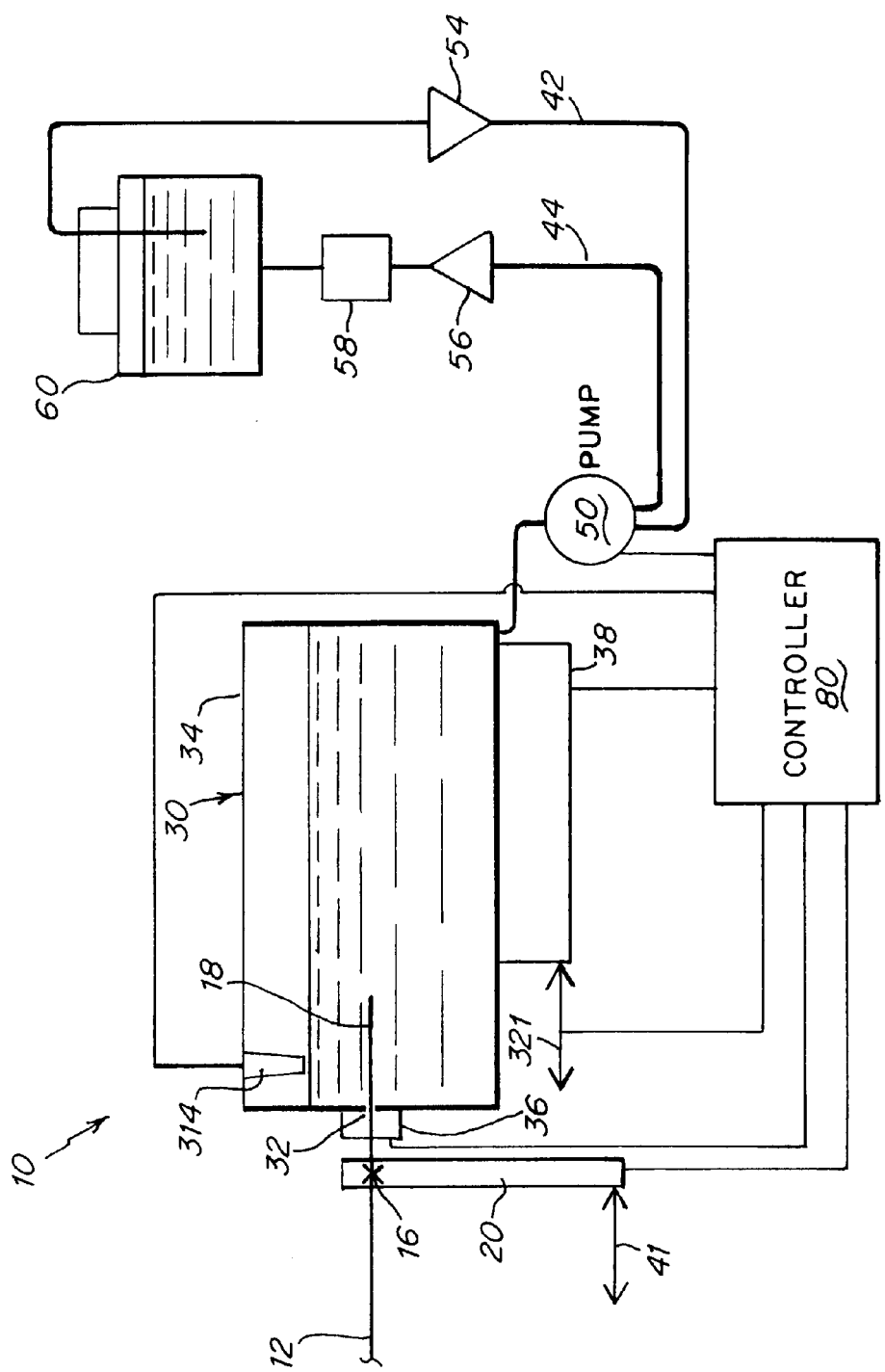
FIG. 1 illustrates a schematic diagram of one illustrative embodiment the cleaning device of the invention.
Figure 2A:
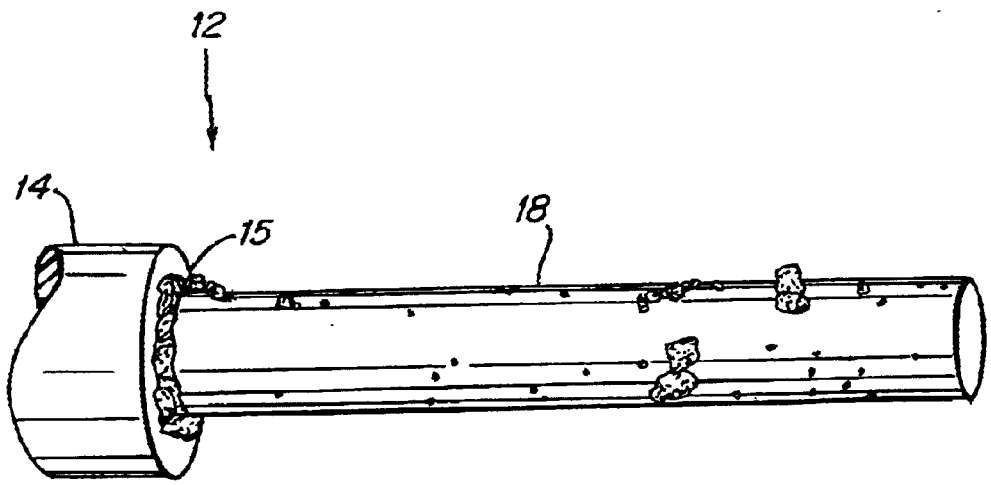
FIG. 2a illustrates a magnified view of an end of an optical fiber after it has been stripped of its outer coating and illustrating residual buffer material and debris that may contaminate the fiber.

Referring to FIG. 1, there is illustrated a schematic diagram of one embodiment of a cleaning device 10 of the invention. This illustrative embodiment of the cleaning device can be used to clean and remove debris and residual buffer material from a stripped end of an optical fiber. FIG. 2a illustrates a magnified view of such an optical fiber 12 after an outer coating 14 has been removed from the end of the optical fiber. As illustrated in FIG. 2a, the optical fiber can contain debris and residual material that remains on the optical fiber after the outer coating has been removed. It is desirable to remove this debris and residual material. The cleaning method and cleaning device of this invention can be used to remove this debris and residual material.

Referring again to FIG. 1, the cleaning device comprises a clamping assembly 20 that can hold the optical fiber 12 such that the optical fiber is aligned along a horizontal clamping axis 16, with one end of the optical fiber 18 protruding from the clamping assembly through an aperture 32 in a tank assembly 30. As will be described in further detail infra, one aspect of the clamping assembly is that it can hold the fiber by gripping the outer coating 14 of the fiber after a fiber to coating transition 15 (See FIGS. 2a–2b). Another aspect of the clamping assembly is that it can be provided with a sealing mechanism that provides a fluid tight seal around an outer circumference of the optical fiber coating.

According to one illustrative embodiment of the cleaning device 10, the tank assembly 30 may be moved toward and away from the clamping assembly 20 as illustrated by double arrow 321. According to another aspect of the cleaning device 10, the clamping assembly may be moved as illustrated by double 41 to accommodate gripping the optical fiber at the outer coating 14 after the fiber to coating transition 15 (see FIGS. 2a and 2b).

Once the fiber has been secured by the clamping assembly 20, the tank assembly 30 can be moved in the axial direction along an axis of the fiber toward the clamping assembly so that the end 18 of the fiber 12 enters the tank assembly through the aperture 32.

As will be discussed in greater detail infra, according to one aspect of the tank assembly, the aperture is provided with a sufficient diameter so that any tolerance in the end of the fiber from the clamping axis 16 of the clamping assembly is accommodated by the aperture, such that the end of the fiber threads the aperture into the tank assembly. A further aspect of the clamping assembly is that the clamping assembly can be provided with a sealing mechanism 22 (see FIG. 4) that is constructed and arranged to mate with the aperture 32 of the tank assembly 30 and to provide a fluid seal of the aperture of the tank assembly. For example, the sealing mechanism of the clamping assembly may be biased against and into the aperture of the tank assembly to seal the aperture, and also is constructed and arranged to provide a fluid seal around the optical fiber.

As will be further described infra, another aspect of the illustrative embodiment of the tank assembly 30 is that it can be provided with a sensor 36 to sense that the tank assembly is engaged against the clamping assembly 20, that a seal exists around the optical fiber 12 and that a seal exists for the aperture 32 in the tank assembly 30.

Another aspect of the illustrative embodiment of the cleaning device is that it may include a pump 50 and a fluid reservoir assembly 60. According to one aspect of the cleaning device, once it is sensed that the tank assembly 30 has been moved against the clamping assembly 20, and that a seal exists around the optical fiber 12 and the aperture 32 of the tank assembly, the pump 50 can be activated to draw a cleaning fluid from the fluid reservoir assembly 60 and to pump the cleaning fluid into a tank 34 of the tank assembly.

According to one aspect of the tank assembly, the tank assembly can be provided with at least one sensor 314 to sense that the tank is filled with the cleaning fluid to a desired level. It is to be appreciated, however, as will be discussed in detail infra, that the tank assembly can also be provided with a second sensor 316 (not illustrated in FIG. 1) that senses whether the fluid in the tank assembly has been drained to a certain level or completely removed. Thus, the tank assembly can be provided with at least one sensor 314 to sense that the tank is filled with a cleaning fluid to a desired level, and the pump can be activated to pump the cleaning fluid to the tank 34 until the tank is filled.

As will be discussed in further detail infra. According to another aspect of the illustrative embodiment of the cleaning device 10, the cleaning device comprises a controller 80 that controls, for example, any of the clamping assembly 20, servo or actuator assemblies to move the clamping assembly and the tank assembly along respective axis 41, 321, the pump 50 and an ultrasonic generator 38. According to this illustrative embodiment of the cleaning assembly, once the fluid level sensor 314 senses that the tank has been filled with the cleaning fluid to the desired level, the pump 50 can be deactivated by the controller. In addition, the ultrasonic generator 38 can be activated to emit ultrasonic waves within the fluid of the tank assembly. As will be discussed in further detail infra, the ultrasonic generator can be activated for a selected period of time to clean the end of the fiber submerged within the cleaning fluid of the tank 34. After such time, the ultrasonic generator can be deactivated by the controller. Further, the pump assembly can be activated by the controller to pump the fluid in the tank 34 to the fluid reservoir assembly 60.

According to the illustrative embodiment of the cleaning device 10, the cleaning device can also be provided with at least one check valve 54, 56 disposed between the pump 50 and the fluid reservoir assembly 60. The check valve can be used to prevent the pump from pumping the fluid in one direction. For example, a check valve 54 can be provided to ensure that the cleaning fluid flows in one direction from the fluid reservoir assembly 60 to the tank assembly 30 in one fluid line 42. Another check valve 56 can be provided to ensure that the cleaning fluid flows in one direction from the tank assembly to the fluid reservoir in a second fluid line 44. In addition, the illustrated embodiment of the cleaning device can be provided with a filter 58 between the pump 50 and the fluid reservoir assembly 60, that filters out any debris or residual buffer material that is in the fluid so that the fluid can be reused, and so that the cleaning device is a closed loop fluid device.

Figure 2B:
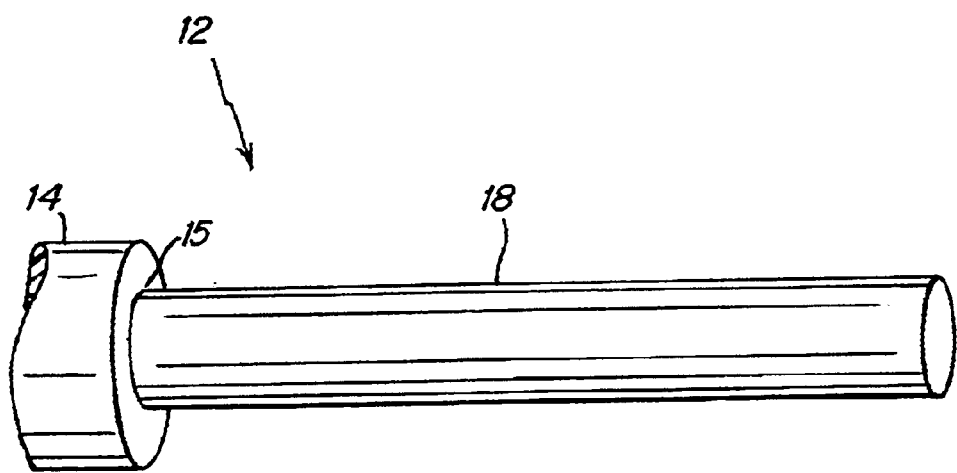
FIG. 2b illustrates a magnified view of an optical fiber after it has been cleaned by the cleaning device of the present invention.

According to another aspect of the illustrative embodiment of the cleaning device 10, the tank 34 of the tank assembly 30 may be moved along axis 321 away from and out of engagement with the clamping assembly 20, so that the clamping assembly no longer seals the aperture 32 of the tank. According to the illustrative embodiment, once the fluid has been pumped by the pump 50 from the tank assembly 30 to the fluid reservoir assembly 60, the tank assembly 30 can be moved to a position no longer in engagement with the clamping assembly 20. According to this embodiment, the clamping assembly can also be controlled to move to an open position so that the fiber can be removed from the clamp assembly 20. FIG. 2b illustrates a magnified view of an optical fiber after it has been cleaned by the illustrated embodiment of the cleaning device 10 of the invention.

According to one aspect of the illustrative embodiment of the cleaning device 10 of the invention, the fiber may be allowed to dry for a period of time, such as, for a few seconds and may be subsequently processed, for example, by an automatic fiber manufacture system such as described in co-pending U.S. application, Apparatus and Method for preparation of an optical fiber, filed on even date herewith. For example, the fiber may subsequently be cleaved and a ferrule may be attached to the cleaned and cleaved end of the fiber to produce a fiber optical pigtail.

Figure 3:
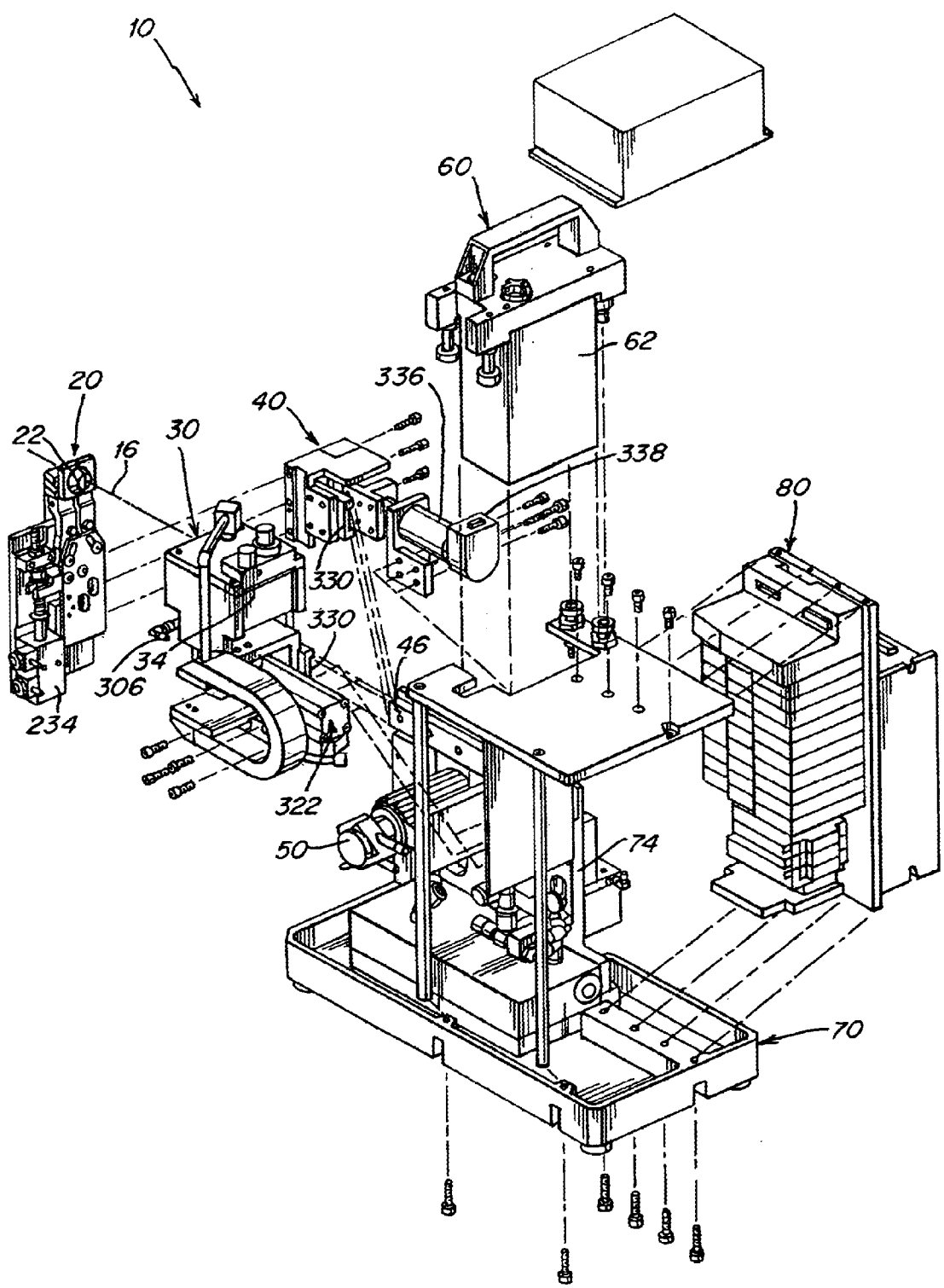
FIG. 3 illustrates a perspective view of one illustrative embodiment of a cleaning device of the present invention.

FIG. 3 illustrates a perspective view of one embodiment of the cleaning device 10 of the invention. The cleaning device comprises a clamping assembly 20, a tank assembly 30, a servo assembly 40, a pump device 50, and a fluid reservoir assembly 60, a frame assembly 70, a controller 80, and an actuator 322. The frame assembly may house various assemblies of the cleaning device 10. The controller 80 may contain any of software and/or hardware and may be coupled to and control the various assemblies and devices of the cleaning device and may also contain, for example, an interface to a central controller such as a personal computer. Accordingly, the controller assembly may have some local control and may also be interfaced to a network to allow for central control. Further, it is to be appreciated that according to one aspect of the cleaning device, the cleaning device may be one device in an overall assembly for processing an optical fiber such as described in co-pending U.S. application, Apparatus and Method for preparation of an optical fiber, filed on even date herewith. The overall assembly may, for example, automatically process and manufacture an optical fiber pigtail under the control of a central controller Referring to FIG. 4, one embodiment of the clamping assembly 20 is directed to positioning and holding an optical fiber along a predefined clamping axis 16. The clamping assembly captures a fiber having an outer diameter within a range of diameters, and positions the optical fiber coaxial with the clamping axis 16. The clamping assembly also captures and positions the optical fiber regardless of its location within a region of uncertainty about the clamping axis. The clamping assembly includes clamping heads 212, 214 that are movable between an open position for receiving and releasing the optical fiber, and a closed position for capturing and centralizing the optical fiber along the clamping axis. The clamping heads may be configured to form a radial opening when in the open position to receive the optical fiber in a radial direction relative to the clamping axis 16. The clamping heads may form a fiber receptacle in the closed position that is adapted to radially position the optical fiber coaxial with the clamping axis.

The clamping heads 212, 214 may be configured to apply a desired clamping force in the closed position to grip and retain the optical fiber, without damaging the optical fiber. In this regard, the clamping heads may be configured to grip the optical fiber with minimal, if any, shear force placed on the optical fiber. Additionally, the clamping assembly 20 may be adapted so that the clamping force of the clamping heads is adjustable.

Each clamping head 212, 214 may include two respective clamping surfaces 215, 216; 217, 218 (see FIG. 5) that are configured to cooperate with respective opposing clamping surfaces to centralize and grip the optical fiber along the clamping axis 16. The pair of opposing clamping surfaces move toward a pair of clamping planes that intersect each other along the clamping axis. It is to be appreciated that the intersecting plane configuration of the clamping surfaces facilitates the accurate positioning of the optical fiber along the clamping axis.

The clamping assembly 20 may also be configured to automatically actuate the clamping heads between the open and closed positions. Further, the clamping assembly may be provided with one or more sensors 244, 248 to determine the position of the clamping heads in the open or closed positions, and/or a fiber sensor 256 to sense a presence of the optical fiber within the fiber receptacle.

Figure 4:
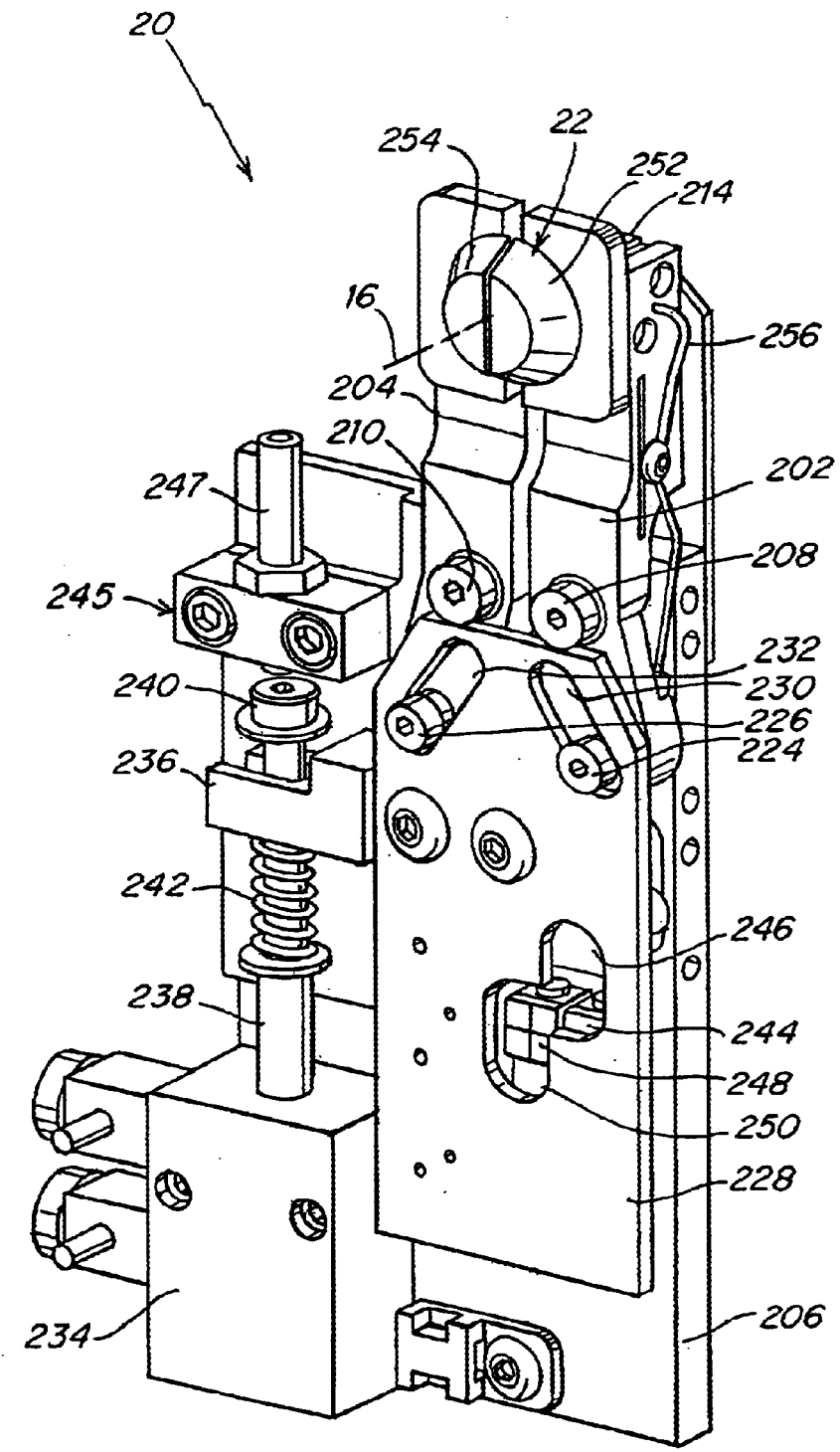
FIG. 4 illustrates a view of one embodiment of a clamping assembly of the cleaning apparatus of the present invention.

Referring to FIG. 4, there is illustrated a view of one illustrative embodiment of the clamping assembly 20. According to one aspect, the clamping assembly comprises two clamping arms 202, 204, which are coupled to a base 206 by respective arm pivots 208, 210. The clamping arms 202, 204 may comprise respective clamping heads 212, 214, as illustrated in one illustrative embodiment in FIG. 5. The clamping assembly is configured to support the clamping heads relative to a predefined clamping axis 16. In the open position, the clamping heads form a radial opening that is adapted to receive an optical fiber in a radial direction relative to the clamping axis 16. In the closed position, the clamping heads capture the optical fiber located anywhere with a region of uncertainty between the clamping heads and position the optical fiber along the clamping axis.

Each clamping head 212, 214 comprises two respective clamping surfaces 215, 216; 217, 218, that are angled relative to each other so that, when the clamping assembly is closed, the respective at least two clamping surfaces cooperate to position the optical fiber along the clamping axis 16. In the illustrative embodiment shown in FIG. 5, the clamping surfaces are oriented to form a generally V-shaped notch in the clamping heads 212, 214. This configuration provides two centralizing zones or notches 220, 222 to facilitate accurate positioning of the optical fiber coaxial with the clamping axis 16. However, it is to be appreciated that each clamping head 212, 214 may comprise any number of clamping surfaces which may be of the same width or of different widths and that variations or alterations readily apparent to those of skill in the art are intended to be within the scope of this disclosure. For example, each clamping head may include three, clamping surfaces comprising a central clamping surface and a pair of end clamping surfaces which form a generally V-shaped notch, such as described in more detail in co-pending U.S. application entitled Centralizing Clamp for an optical fiber, filed on the same date herewith.

Figure 5:
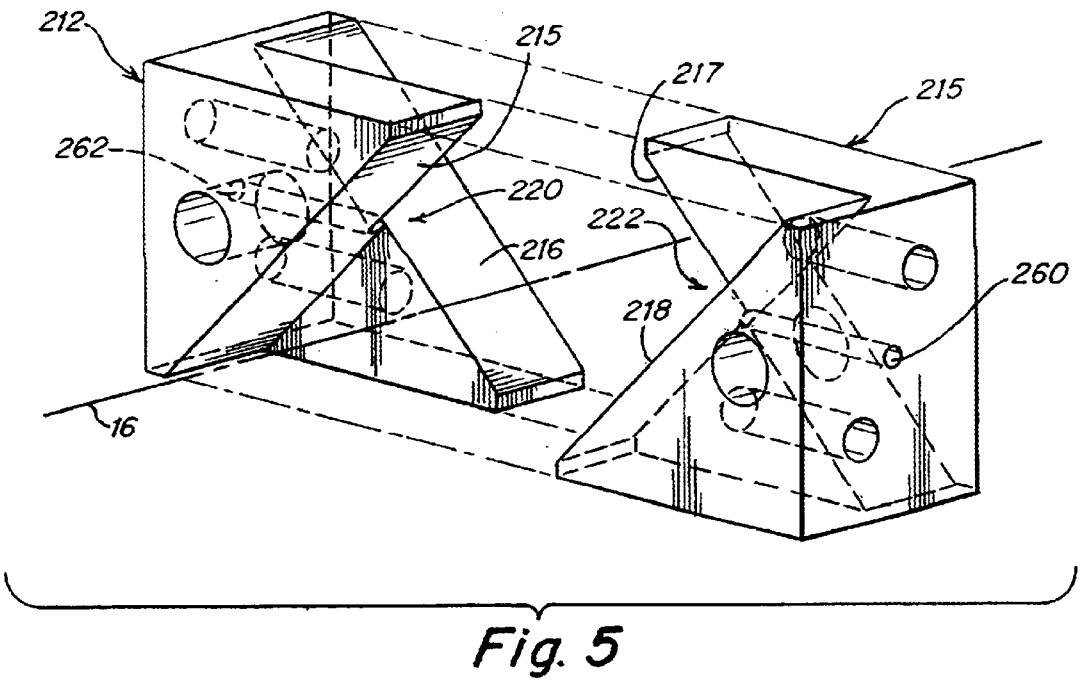
FIG. 5 illustrates an embodiment of a pair of clamping heads that may be used in the clamping assembly of FIG. 4.

As illustrated in FIG. 5, the clamping heads 212, 214 are configured to nest with each other so that the respective clamping surfaces are positioned opposite each other as the clamping assembly is closed about the optical fiber. The illustrated opposing V-notch arrangement acts to surround an optical fiber located in the region of uncertainty between the clamping heads and to collect the optical fiber in a fiber receptacle that is formed by the notches 220, 222 along the clamping axis 216. It is to be appreciated that as the position of the clamping heads change relative to each other, the size of the fiber receptacle varies about the clamping axis so that the clamping heads may position fibers of varying diameters coaxial with the clamping axis.

According to one aspect of the illustrated clamping heads 212, 214, the V-shaped clamping heads exert equal and of opposite clamping forces on an optical fiber gripped between the clamping heads with minimal, if any, shear forces being induced in the optical fiber. This arrangement evenly distributes opposing forces over a large area of the optical fiber and thereby reduces any risk of damaging the optical fiber, allowing the clamping assembly to exert sufficient force to hold the fiber in position within the fluid tank assembly 30.

Accordingly, it is to be appreciated that the clamping arms 202, 204 are adapted to provide a fiber receptacle that positions the optical fiber between the clamping heads 212, 214 when biased to the closed position, and that accommodate desired diameters of optical fibers. For example, optical fibers used in the industry may have a diameter up to approximately 900 microns. It is to be appreciated that the clamping assembly 20 of the invention can accommodate any desired optical diameter, such that when the clamping arms are moved to the closed position, the optical fiber is centered to along the clamping axis.

Referring again to the illustrative embodiment of FIG. 4, the clamping arms 202, 204 are movably attached to the base 206 by, for example, arm pivots 208, 210 and each clamping arm may also comprise a respective cam follower 224, 226. The cam followers may be coupled to a cam plate 228 that is movably supported by the base. An upper end of the cam plate may include respective angled slots 230, 232 that cooperate with the cam followers 224, 226. According to one aspect of this embodiment of the clamping assembly, the clamping heads 212, 214 may be moved from an open position to a closed position by movement of the cam plate 228 in an upward direction, which causes the cam followers 224, 226 to move within the angled slots 230, 232 and causes the clamping arms 202, 204 to move above the arm pivots 208, 210 from the open position to the closed position. It is also to be appreciated that the clamping arms may be moved from the closed position to the open position by moving the cam plate 228 in a downward direction which moves the cam followers toward each other in the angled slots, which in turn rotates the clamping arms to the open position. It is to be appreciated that various modifications will be readily apparent to one of skill in the art and that any suitable arrangement employed to move the clamping arms between the open and closed positions are intended to be within the scope of this description.

According to one embodiment of the clamping assembly 20, the cam plate 228 may move in the upward and downward directions to provide the opening and closing of the clamping arms 202, 204. In the illustrative embodiment, the actuator may comprise an air cylinder with a piston 238 that is extended and retracted in response to a signal provided by the controller 80 to the actuator 234. According to one aspect, the actuator 234 may be coupled to the cam plate 228 by a fixture 236 that is rigidly attached to the cam plate. With this arrangement, the fixture is coupled to the piston that is extended and retracted to move the cam plate. It is to be appreciated, however, that any suitable actuation arrangement may be implemented to drive the cam plate relative to the base. For example, a motor and a lead screw arrangement may also be used to drive the cam plate or the fixture.

As was discussed above, it may be desirable to grip the optical fiber with sufficient force to securely hold the optical fiber in position, without damaging the optical fiber. For example, the amount of clamping force exerted by the clamping assembly 20 may vary depending upon the type or size of optical fiber that is to be clamped. According to the illustrative embodiment, the clamping assembly may be configured to control the amount of clamping of force applied to the fiber. In the illustrative embodiment, a compression spring 242 is disposed between the piston 238 and the fixture 236. The spring may be held in place with any suitable retainer, such as a shoulder screw 240, that extends from one end of the piston into the fixture. With this arrangement, once the piston drives the clamp assembly to its closed position, further extension of the piston simply causes the compression spring to compress against the fixture to generate a clamping force between the clamping heads.

According to one aspect of the illustrated embodiment, it is to be understood that an amount of clamping force presented by the clamping arms on an optical fiber can be adjusted by an amount of deflection allowed in the compression spring 242. For example, according to one aspect of the clamping assembly, the compression spring may be pre-biased by a certain amount of deflection to allow additional deflection or to limit additional deflection in the compression spring, by the actuator. With this arrangement, the spring can be prebiased to provide the clamping arms with a certain clamping force, which according to one aspect of the clamping assembly may hold the optical fiber with sufficient pressure so that it cannot freely move between the clamping heads, but also so that there is no damage to either the optical fiber or the coating surrounding the optical fiber. In other words, the clamping force can be just sufficient to hold the optical fiber with no damage to the optical fiber. It is also to be appreciated that various alternatives for adjusting the force provided by the clamping arms will be readily apparent to those of skill in the art, and that such alternatives are intended to be within the scope of this disclosure.

For example, one alternative is to have different springs of different spring constants to allow for different pressure to be exerted by the clamping arms. Alternatively, another alternative is to provide the clamping assembly with a stop 245. In the illustrated embodiment, the clamping assembly includes the stop 245 that is aligned with the piston 238 so as to be engaged by a retainer 240 as it is driven upward by the piston 238. Once the retainer engages the stop, further extension of the piston is blocked, thereby limiting an amount of spring compression and, therefore the clamping force provided to the optical fiber.

With this arrangement, the clamping force may be adjustable, for example to accommodate different diameters and different coatings of the optical fiber, and to allow for a desired force to be exerted on the optical fiber. For example, the stop 245 may be arranged so that when the retainer 240 comes in contact with the stop, the actuator cannot provide any more pressure on the fixture 236 and the cam plate 228, so that the clamping heads 212, 214 are in what will be their fully closed position. In other words, once the retainer has contacted the stop, there may be no further movement of the cam plate and no further pressure exerted by the clamping heads 212, 214. According to this embodiment of the clamping assembly, it is to be appreciated that any additional pressure exerted by the piston 238 of the actuator 234 will be absorbed by the compression spring 242. To adjust the clamping force, the stop may comprise an adjustable pin 247 that may be extended toward and retracted away from the retainer. It is to be appreciated that since the amount of clamping force is a function of the spring constant and the amount of spring compression, one or both of these parameters may also be fixed or adjusted to achieve a desired clamping force.

According to another aspect of the invention, the clamping assembly can be provided with a sensor 244 that senses whether the clamping arms are in the open or closed positions. Referring to the illustrated embodiment of FIG. 4, there may be at least one sensor 244 supported by the base 206. The sensor may be an inductive proximity sensor that responds to the presence of a metal located adjacent the sensor. In addition, the cam plate 228 may be provided with at least one aperture 246, which is constructed and disposed within the cam plate so that in one of the open or closed positions the cam plate is adjacent to the sensor, and in the other of the open or closed positions the opening is adjacent to the sensor. For example, in the illustrated embodiment, the inductive proximity sensor 244 senses that the cam plate 228 is adjacent to the sensor and that the clamping arms are in the closed position, and also senses that the aperture is adjacent to the sensor, and thus senses that the clamping arms are in the open position. It is to be appreciated that there are various alternatives for sensing whether the clamping arms are in the open or closed position, and these modifications are intended to be within the scope of this disclosure.

For example, the illustrated embodiment comprises the first sensor 244 and a second sensor 248 also supported by the base 206. The cam plate is also provided with a second aperture 250. The second sensor 248 may also be an inductive proximity sensor. With this arrangement, the second sensor senses the second aperture 250 in the cam plate when the clamping assembly is in the closed position, while the first sensor 244 will sense the adjacent cam plate 228. The first sensor will sense the presence of the metal plate adjacent the first sensor and provides an electrical signal indicating that the clamping assembly is in the closed position. Alternatively, when the clamping assembly is in the open position, the first sensor will sense the opening 246 in the cam plate 228, while the second sensor will be adjacent and will sense the cam plate 228. With this arrangement, the second sensor generates an electric signal indicating that the clamping assembly is the open position. It is to be appreciated that one advantage of this arrangement is that a positive signal sensing the adjacent cam plate 228 is generated by both sensors in both the open and closed positions.

It is to be appreciated that various alterations to this embodiment may be readily apparent to those of skill in the art and are also intended to be within the scope of this disclosure. For example, the arrangement of the openings 246, 250 may be reversed so that the first sensor senses the open position and the second sensor senses the closed position. It is also to be appreciated that different types of sensors may be used other than proximity type sensors to monitor the clamping arm positions and the use of such sensors is intended to be within the scope of this disclosure. For example, an optical sensor may be used.

According to another aspect of the illustrated embodiment of the clamping assembly, the clamping assembly may be provided with the sealing mechanism 22 that seals around the diameter of the optical fiber and that mates with the aperture 32 and a sealing gland 304 (see FIG. 6) of the tank 34 of the tank assembly 30. With this arrangement, the sealing mechanism 22 will seal the aperture 32 through which the fiber extends into the tank 34 with the sealing mechanism 22 of the clamping assembly. The sealing mechanism may comprise opposing sealing members 252, 254. As was briefly described above, the sealing members and clamping assembly 20 may be used to clamp the fiber in a position with an end 18 of the optical fiber 12 protruding from the sealing members 252, 254 so that the end 18 of the fiber can be threaded through the aperture 32 of the tank 34 of the tank assembly 30. It is to be appreciated that the sealing members may be attached to the clamping arms 202, 204 by any attachment means such as a bolt, screw, rivets, epoxy, and the like. The sealing members are configured to be compressed around the outer coating 14 of the optical fiber in the closed position. The sealing members are also configured to form a plug that is inserted into the aperture 32 of the tank 34. In the illustrated embodiment, the plug has a frusto-conical shape that corresponds to the aperture 32 and sealing gland 304 of the tank 34. It is to be appreciated that the plug can be formed from a compliant, solvent resistant material, such as a polyurethane material having a hardness of 55 Shore. It is also to be appreciated that the seal may be formed from any suitable material for preventing leaking of a solvent or other fluid. It may also have any suitable shape that is compatible with a corresponding aperture 32 in the tank 34. For example, the sealing mechanism may comprise sealing members having many shapes, such as the illustrated frusto-conical or cork-shaped sealing member (see exploded view in FIG. 7a). An alternative sealing mechanism may comprise sealing members 257, 259 and may be described as a super imposed bulls-eye shape, as illustrated in FIG. 7b.

According to another aspect of the clamping assembly, the clamping assembly may also be provided with an optical fiber sensor 256 adapted to detect a presence of the optical fiber within the fiber receptacle between the clamping heads 212, 214. For example, in one embodiment a sensor may be supported adjacent at least one of the clamping heads and positioned to monitor the fiber receptacle. It is to be appreciated, however, that the sensor may be placed in any location, within or adjacent clamping heads, and that is suitable for detecting the presence of an optical fiber when the clamping assembly is in the closed position. For example, in the illustrative embodiment the fiber sensor 256 is a reflective optical sensor located in a first aperture 260 within one of the clamping heads 214, and there is a corresponding hole 262 in the opposing clamping head 212 (see FIG. 5). It is to be appreciated that the sensor may be a reflective optical sensor, or other types of suitable sensors. With this arrangement, with the clamping heads in the closed position and an optical fiber located between the clamping surfaces 215, 216, 217, 218, the sensor will emit an optical signal which may be reflected from the optical fiber and sensed by the optical sensor. In response to detection of the reflected optical signal by the optical sensor, the optical sensor may generate a signal indicating the presence of the optical fiber. If no fiber is present, the light emitted by the optical sensor may pass through the fiber receptacle between the clamping surfaces and the corresponding opposing hole in the opposing clamping head, and no reflected light will be detected by the optical sensor. Thus, the optical sensor will indicate that no optical fiber is present.

It is to be appreciated that various alterations and modifications to a fiber sensor may be readily apparent to those of skill in the art and that such alterations and modifications are intended to be within the scope of this disclosure. For example, an optical emitter may be disposed within the aperture 260 of one clamping head 214 and an optical sensor may be disposed in the aperture 262 of the opposing clamping head 212, such that the optical sensor will sense the optical signal when no optical fiber is present and will not sense an emitted optical signal when the optical fiber is present.

Figure 6:
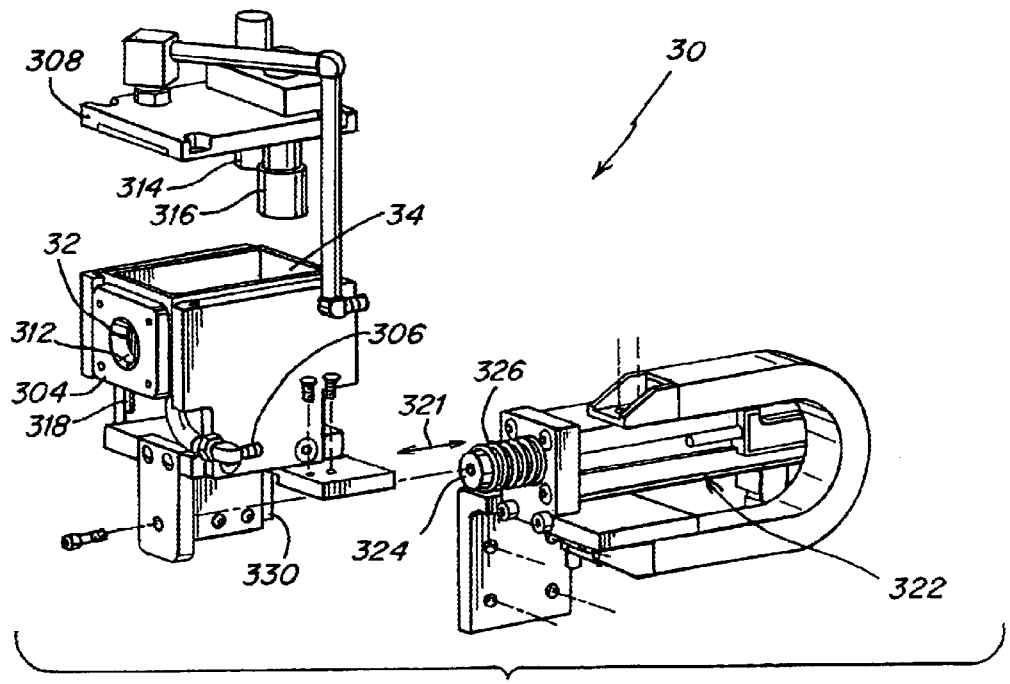
FIG. 6 illustrates an exploded view of one embodiment of a tank assembly of the cleaning apparatus of the present invention.
Figure 7A:
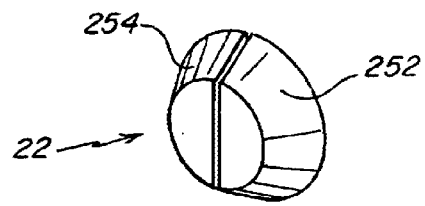
FIGS. 7a and 7b illustrate various embodiments of sealing jaws that may be used in the clamping assembly of the cleaning apparatus of the present invention.
Figure 7B:
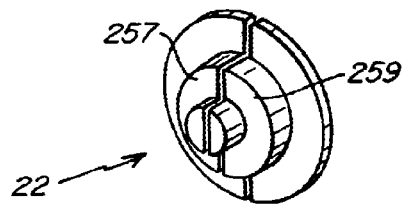

Referring to FIG. 6, there is illustrated an embodiment of a tank assembly 30 of the cleaning apparatus 10. According to this illustrated embodiment, the tank assembly 30 comprises a tank 34, an aperture 32 for receiving an optical fiber held by the clamping assembly 20, and a sealing gland 304. According to one aspect of the illustrated embodiment, the aperture 32 and the sealing gland 304 are shaped and arranged to mate with the sealing mechanism 22 of the clamping assembly 20 and, in particular, the sealing members 252, 254 (see FIG. 7a) of the clamping assembly. With this arrangement, the combination of the sealing mechanism 22 and the sealing gland 304 provide a fluid seal of the aperture 32 and tank 34, with the clamping assembly holding an optical fiber within the tank 34. Further, with the optical fiber held in the tank by the clamping assembly 22 to form the fluid seal, the tank 34 can be filled with a cleaning fluid without the cleaning fluid leaking from the tank and sealing mechanism 22 interface. It is to be appreciated that alterations and modifications to the sealing mechanism and sealing gland may be apparent to those of skill in the art, and that such modifications and alterations are intended to be within the scope of this disclosure.

The illustrated embodiment of the tank assembly 30 may also be provided with a fill/drain port 306 that may be coupled to a fluid line and the pump 50 (see FIG. 3), to pump the fluid from a fluid reservoir assembly 60 (see FIG. 3) to the tank 34, and also to the pump the cleaning fluid from the tank 34 to the fluid reservoir assembly. The pump 50 and the fluid reservoir assembly 60 will be described in further detail infra. It is to be appreciated that various modifications may be readily apparent to one of skill in the art and that these modifications are intended to do within the scope of this disclosure. For example, although the tank assembly is illustrated with one fill/empty port, it may be provided with a fill port and an empty port that each may be coupled to one or more pumps.

According to another aspect of the illustrated embodiment of the tank assembly, the tank assembly may be provided with a top assembly 308. In addition, referring to the schematic of FIG. 1, the tank assembly may be provided with a sensor 314 for sensing a fluid level in the tank 34. In the illustrated embodiment of FIG. 6, the top assembly 308 is provided with a first sensor 314 and a second sensor 316. According to one aspect of the tank assembly 30, each of the sensors 314, 316 may be capacitive sensors that sense a capacitance associated with a fluid level of the cleaning fluid inside the tank 34. It is also to be appreciated that alternative sensors may also be used, such as, optical sensors, and the like. With this arrangement, one sensor 314 may be calibrated and used to detect the presence of the cleaning fluid up to a desired fill level in the tank. In other words, the sensor 314 may detect whether the tank is filled with the cleaning fluid. In addition, the other sensor 316 can be calibrated and used to sense that the tank is not empty. In particular, the second sensor may be calibrated to detect the presence of some fluid in the tank, which is indicative that the tank is not empty. With this arrangement, the first and second sensors act in concert to detect when the tank is filled with the cleaning fluid, when the tank is not empty (when the tank is neither full nor empty), and therefore also when the tank is empty. In the illustrated embodiment, the first and second sensors may also be coupled to controller 80. The sensors can monitor the different levels of the cleaning fluids as sensed by the first and second sensors, and provide this information to the controller. It is to be appreciated that various modifications to the top assembly may be readily apparent to those of skill in the art and that such modifications are intended to be within the scope of this disclosure. For example, the second sensor may be used to detect that the tank is empty. In addition, each sensor can be provided with respective sensor electronics. Further, the sensor electronic may include a processor that determines the fluid levels as indicated by the sensor signals, and may provide this information to the controller 80.

Referring again to FIG. 3 in conjunction with FIG. 6, controller 80 may be coupled to the sensor to monitor the fluid level within the tank 34. In addition, controller 80 may be coupled to an ultrasonic transducer 38 (not illustrated). With this arrangement the cleaning fluid level in the tank can be monitored, and when it is filled to a desired level, the ultrasonic transducer 38 may be turned on for a predetermined period of time, which is adaptable to various conditions. For example, the predetermined length of time may be selected to optimize cleaning the optical fiber after the outer coating has been stripped from the end of the optical fiber, for different optical fibers having different diameters, outer coatings, coating types and the like. With this arrangement, ultrasonic transducer 38 may remain on for the predetermined period of time and then be deactivated by the controller 80. It is to be appreciated that various alterations and modifications may be readily apparent to those of skill in the art and that such modifications are intended to be within the scope of this disclosure. For example, the transducer may be other than ultrasonic and the controller may be implemented in any of hardware, software and combinations thereof.

According to another aspect of the illustrated embodiment of the tank assembly 30, the tank assembly may be provided with a vacuum port 318. The vacuum port 318 may be coupled to a vacuum sensor 320 and vacuum assembly 72 (see FIG. 10). In addition, the sealing gland 304 may be provided with an aperture 312 coupled to the vacuum port 318. Further, the vacuum sensor 320 may be coupled to the controller 80. With this arrangement, the vacuum sensor can sense when there is a vacuum seal present at the interface between the sealing gland 304 of the tank 34 and the sealing mechanism 22 of the clamping assembly 20. The vacuum assembly 72 can be interfaced to the vacuum port 318 to provide a suction through the aperture 312. With this arrangement, the vacuum sensor 320 can detect the presence of a strong vacuum and a weak vacuum. A strong vacuum can be an indication that there is a fluid seal between the tank assembly 30 and the clamping assembly 20. Less vacuum pressure may indicate that there is no seal or that the seal is not fluid tight. Moreover, the aperture 312 and vacuum port 318 can be used to suction any residual cleaning fluid that may reside at the interface, when the tank assembly 30 is disengaged from the cleaning assembly 22. Further, the combination of the aperture 312, the vacuum port 318 and vacuum assembly 72 may also be used to vacuum any fluid leaks that occur at this interface.

It is to be appreciated that, with this arrangement, there is an automatic sensing of a fluid seal between the tank assembly 30 and the clamping assembly 22. This detection of a fluid seal can initiate a sequence of steps of a method of cleaning a portion of an optical fiber, comprising, for example, the filling the tank assembly 30 with the cleaning fluid, activating the ultrasonic transducer 38 to clean the optical fiber for the predetermined period of time and draining the tank of cleaning fluid. For example, after the optical fiber has been clean for a selected time period, the pump 50 may pump the cleaning fluid out of the tank assembly 30 to the fluid reservoir assembly 60. It is to be appreciated that various alterations and modifications to the vacuum port and vacuum sensor may be readily apparent to those of skill in the art and are intended to be within the scope of this disclosure. For example, in addition to vacuum port that suctions off any residual cleaning fluid, there may also be provided an additional sensor, such as, an optical sensor to detect a fluid seal between the tank assembly 30 and the clamping assembly 20.

Another aspect of the illustrated embodiment of the cleaning apparatus 10 and the tank assembly 30 is that it may be provided with an actuator assembly 322, as illustrated in FIG. 6. The cleaning device may also comprise a linear bearing rail 46 (see FIG. 3) and the tank assembly can be provided with a corresponding linear bearing car 330 that mates with the linear bearing rail. The tank assembly may be mounted to the linear bearing car 330 (see FIG. 6). The tank assembly is provided with a pneumatic actuator 322 to move the tank 34 along axis 321 against the clamping assembly 22 and to hold the tank 34 in fluid engagement with the clamping assembly. The pneumatic actuator 322 may operate in a similar manner as the pneumatic actuator 322 of the clamping assembly. In particular, the pneumatic actuator may comprise an air piston 324 and an adjustment spring 326. In the illustrated embodiment, the pneumatic actuator is attached to the frame 74 of frame assembly 70 (see FIG. 3). The air piston may be actuated, for example, against a fixture (not illustrated) rigidly attached to the tank assembly 30. With this arrangement, the pneumatic actuator, in response to an actuation signal, can bias the air piston against the fixture which in turn will urge the tank assembly into engagement with the clamping assembly. In one aspect of this embodiment, the pneumatic actuator will constantly bias the tank assembly against the clamping assembly to provide the fluid seal. In other words, the tank assembly 30 is constantly biased against the frame assembly 22, unless the pneumatic actuator is provided with a deactivation signal from controller 80, and it will stay in the activated position even if there is a power loss. In response to a deactivation signal, the pneumatic actuator may retract the air piston and allow the tank assembly to disengage from engagement with the clamping assembly.

Figure 8:
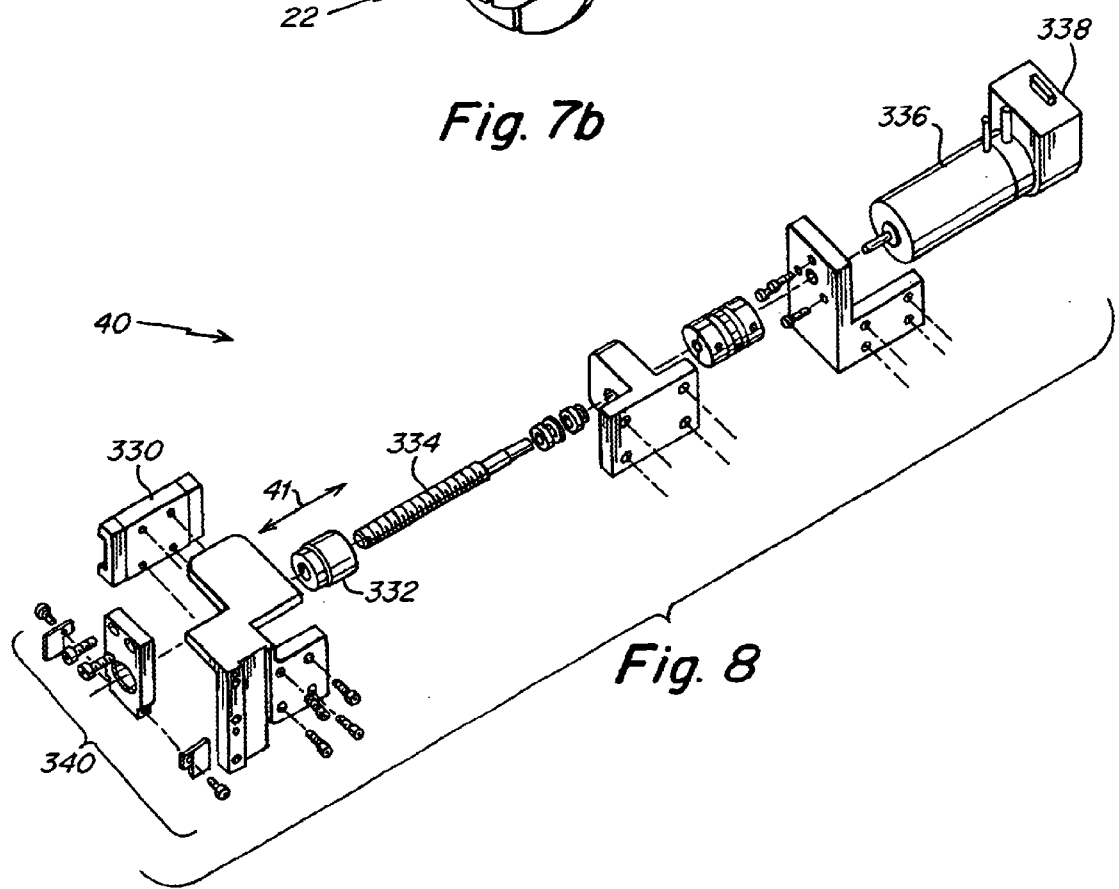
FIG. 8 illustrates an exploded view of one embodiment of a servo assembly of the cleaning apparatus of the present invention.

Another aspect of the illustrated embodiment of the cleaning device 10, is a servo assembly to which is illustrated in detail in FIG. 8. The servo assembly may be coupled to the clamping assembly 20 to move the clamping assembly along axis 41, to facilitate the clamping of the optical fiber 12 at the outer coating 14 beyond the fiber to coating transition 15 (see FIGS. 2a–2b). The illustrated embodiment of the servo assembly may be provided with a nut 332 and a lead screw 334 which are attached to a servo motor 336. According to one aspect of this servo assembly 40, a corresponding linear bearing car 330 can be affixed to the nut 332 by coupling arrangement 340 and the servo motor 336 can rotate the lead screw to move the nut back and forth along the longitudinal axis 41 of the lead screw to a plurality of positions. In addition, the servo motor can be provided with an encoder 338 wherein a plurality of positions of the lead screw and linear bearing car corresponding to encoding positions of the encoder. According to one aspect of the servo assembly, the servo encoder can be coupled to the controller 80. With this arrangement, the controller 80 can control the servo assembly to move the lead screw, nut and the linear bearing car to any of a plurality of positions based on the encoder positions of the encoder. With this arrangement, the linear bearing car and therefore the clamping assembly 20 can be moved to a number of positions away with respect to a stationary optical fiber, which may be held in place, for example, by a tray such as disclosed in co-pending U.S. application entitled Tray for a Coiled Optical Fiber, filed on the same date herewith. With this arrangement the clamping assembly can be moved to a position to hold the optical fiber at the outer coating beyond the fiber to coating transition 15.

It is to be appreciated that according to one aspect of the cleaning device 10 the servo assembly 40 and the pneumatic actuator 322 can in combination move the tank assembly into an engaged and fluid sealed position with the clamping assembly 20. It is also to be appreciated that with this arrangement the clamping assembly can be moved to along axis 41 to a position that the clamping assembly can hold the optical fiber 12 by its outer coating 18, without damaging the optical fiber. It is further to be appreciated that various alterations and modifications may be made by those of skill in the art and are intended to be within the scope of the disclosure.

Figure 9:
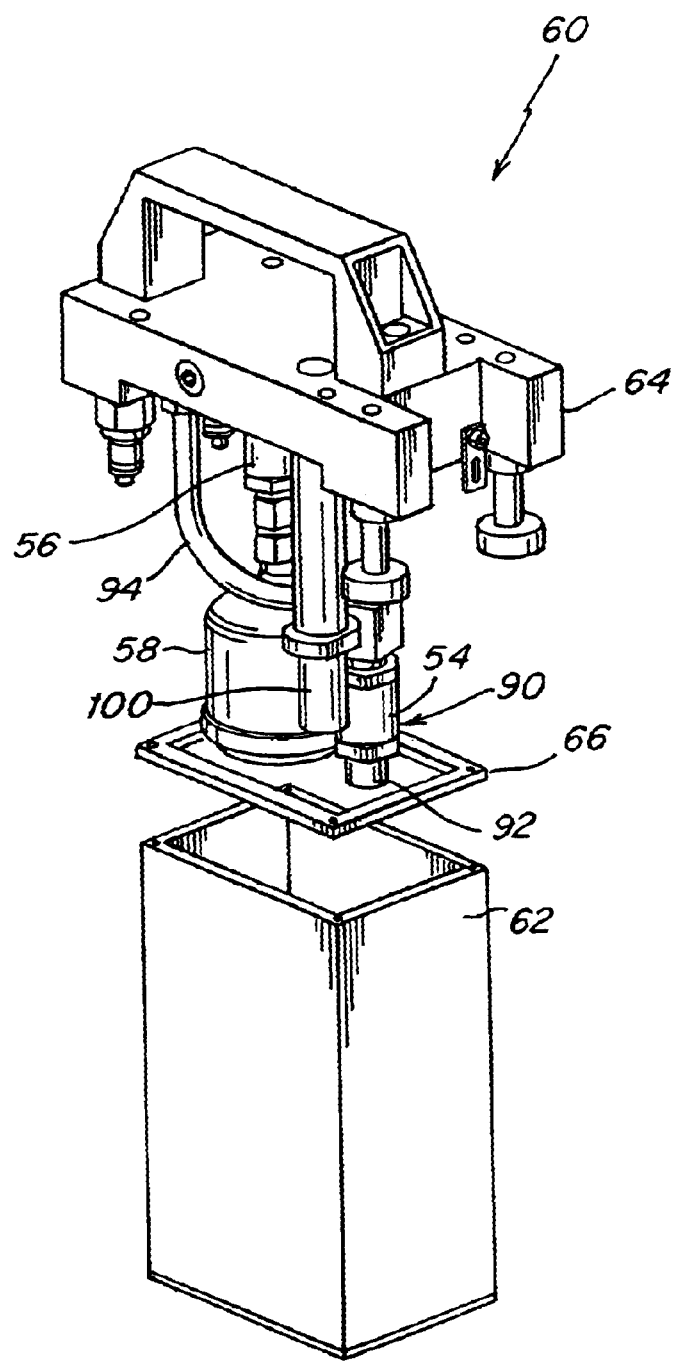
FIG. 9 illustrates an exploded view of one embodiment of a fluid reservoir assembly of the cleaning apparatus of the present invention.

Referring to FIG. 9, there is illustrated an exploded view of an embodiment of the fluid reservoir assembly 60 of the cleaning apparatus 10. According to this embodiment, the fluid reservoir assembly includes a reservoir tank 62, a cap assembly 64, and a gasket 66 that may be disposed between a top of the reservoir tank 62 and the cap assembly 64. The fluid reservoir assembly holds the cleaning fluid and may be coupled to pump 50, which is illustrated with an exploded view of a portion of frame assembly 70 in FIG. 10. According to the illustrated embodiment of the fluid reservoir assembly 60, the cap assembly 64 comprises a dip tube assembly 90 including a dip tube 92 which extends into the reservoir tank 62. The dip tube assembly comprises check valve 54 in series between the dip tube assembly and a fluid line 94 that is coupled to the pump 50. This check valve 54 is arranged to allow cleaning fluid to be drawn by the pump 50 from the reservoir tank 62 to the pump and to be pumped to the tank assembly 30. In addition, the check valve 54 prevents fluid from being pumped by the pump 50 to the fluid reservoir assembly through the dip tube assembly. The illustrated embodiment of the cap assembly 64 is also provided with a second check valve 56 in series with a filter 58. The second check 56 valve allows fluid to be pumped by the pump 50 from the tank assembly 30 to the fluid reservoir assembly 60. With this arrangement, the fluid can be pumped to the fluid reservoir assembly 60 by the pump 50 and filtered by the filter 96 to filter out any debris or residual buffer material that may be in the cleaning fluid.

Figure 10:
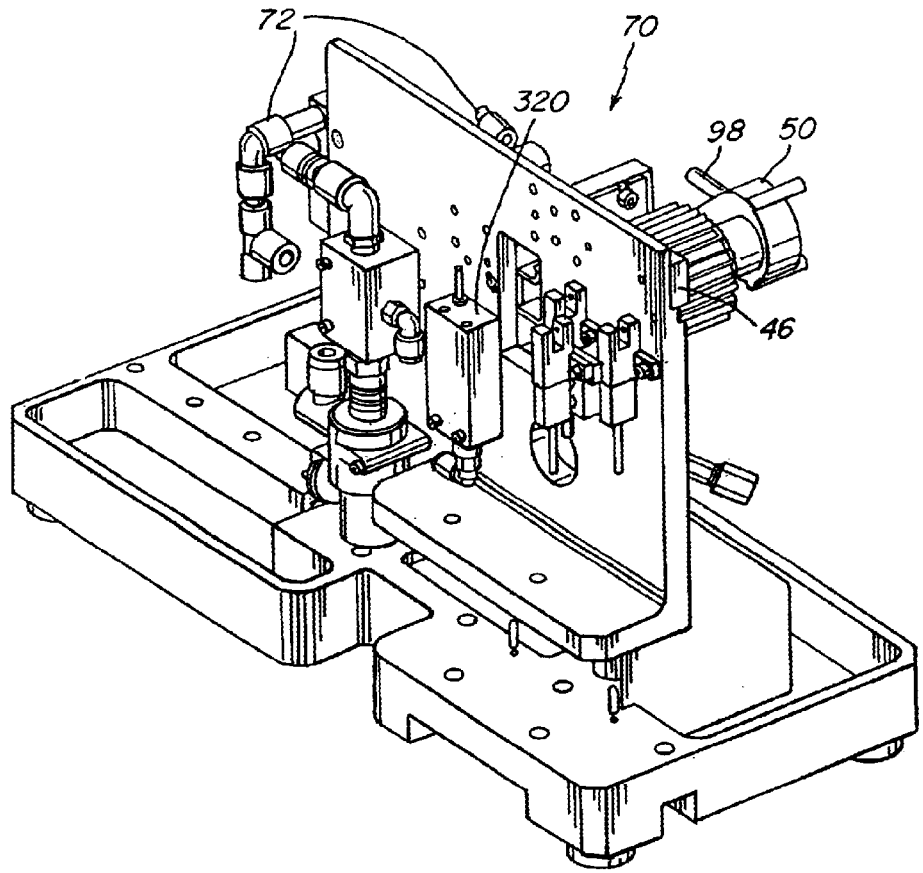
FIG. 10 illustrates an exploded view of one embodiment of a frame assembly of the cleaning apparatus of the present invention.
Figure 11:
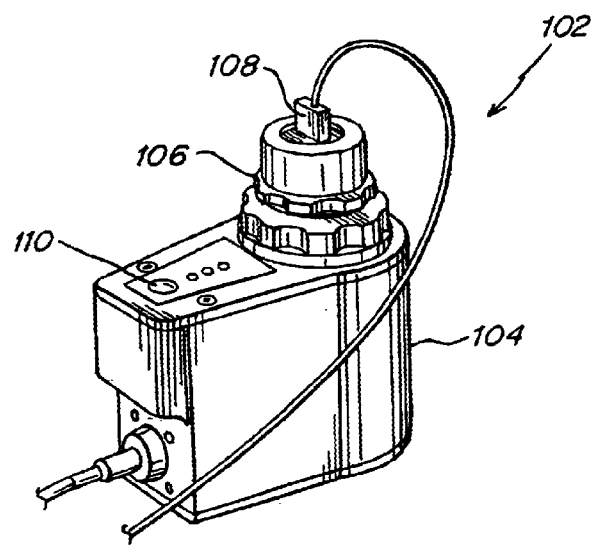
FIG. 11 illustrates a perspective view of a related art ultrasonic cleaning device.

According to the illustrated embodiment each of the check valves 54, 56 may be coupled by a respective fluid line coupled to the pump 50 of FIG. 10. The pump 50 may comprise a first port 98 and a second port (not illustrated). The respective fluid lines may be coupled to the first and second ports. As has been discussed herein, the pump 50 can pump fluid from the fluid reservoir assembly 60 to the tank assembly 30 via the dip tube assembly including dip tube 92, the check valve 54 and the fluid line (not illustrated). In addition, the pump 50 can pump the fluid from the tank assembly 30 to the fluid reservoir assembly 60 via a fluid line (not illustrated), check valve 56 and the filter 58. The check valves 54, 56 to ensure that the fluid only moves in one direction through the corresponding fluid line. It is to be understood that in the illustrated embodiment, the cleaning fluid is filtered when it is pumped to the fluid reservoir assembly. However, it is to be appreciated that modifications of this embodiment may be readily apparent to those of skill in the art and are intended to be within the scope of this disclosure. For example, the filter can alternatively be placed in a series between dip tube assembly 90 and check valve 54 to filter the cleaning fluid as it is pumped from the fluid reservoir assembly to the tank assembly 30. Moreover, more than one pump may be used to pump the fluid in both directions between the fluid reservoir assembly and the tank assembly, a first pump to pump the cleaning fluid from the fluid reservoir assembly to the tank assembly and a second pump to pump the fluid from the tank assembly to the fluid reservoir assembly. It is further to be appreciated that with more than one pump, the check valves may not need to be provided.

The illustrated embodiment of the fluid reservoir assembly 60 may also be provided with a fluid liquid level sensor 100. The fluid level sensor can be an optical sensor, a capacitive sensor or any other sensor known to those of skill in the art. It is to be appreciated that the sensor can be calibrated to sense a level of the cleaning fluid in the reservoir tank 62. In addition, this embodiment can be provided with sensor electronics including, for example, a sensor amplifier that may be coupled to the controller 80 and that receives a sensor signal corresponding to the level of fluid in the fluid reservoir tank 62. With this arrangement, the controller can monitor the level of the cleaning fluid within the reservoir assembly and provide an indication that the cleaning fluid has reached a certain level. The controller 80, with information about the fluid level of the fluid reservoir assembly and with information from the fluid level sensors in the fluid tank assembly 30, can determine whether the cleaning fluid is in the tank assembly 30 or that cleaning fluid should be added to the fluid reservoir assembly 60. For example, this arrangement can determine if there has been an evaporation of the cleaning fluid. It is to be appreciated that various alterations and modifications may be readily apparent to those of skill in the art and that such alterations and modifications are intended to be within the scope of this disclosure. For example, more than one sensor can be used to determine the level of the cleaning fluid in the reservoir tank.

Referring to FIG. 10, there is also illustrated an exploded view of a portion of the frame assembly 70 of the cleaning apparatus 10. According to the illustrated embodiment, the pump 50 may be housed at this part of the frame assembly. In addition, vacuum assembly 72 may also be disposed in this portion of the frame assembly and coupled to aperture 312 in sealing gland 304 through vacuum port 318, (see FIG. 6) and to vacuum sensor 320. This arrangement of the vacuum assembly 72 and the vacuum sensor 320 monitors the vacuum pressure in the vacuum assembly to determine whether there is a fluid seal between the clamping assembly 22 and the tank assembly 30, as discussed herein, and to suction any fluid leaking or remaining at the clamping assembly to tank assembly interface. Further, the illustrated embodiment of the frame assembly may comprise the sensors 244, 248 that monitor the position of the clamping arms 202, 204 of the clamping assembly 20, as discussed herein. It is to be appreciated that various modifications to the frame assembly and to the cleaning assembly may be readily apparent to those of skill in the art and are intended to be within the scope of the disclosure. For example, any of the pump 50, the vacuum assembly 72, the vacuum sensor 320 and the position sensors 244, 248 may not be disposed within this part of the frame assembly.

One embodiment of cleaning fluid that can be used in the automatic cleaning device of the invention is known by the trade name EnSolv® which is manufactured by Enviro Tech International, Inc., 2525 W. LeMoyne Ave., Melrose Park, Ill. 60160. One of the properties of EnSolv® that makes it suitable for the cleaning device 10 of the invention is its relatively high flash point of 400° C. In contrast, isopropal alcohol has a flash point of 12° C. Accordingly, EnSolv® is suitable to the automatic cleaning device of the invention, which has a high throughput of fiber optical assemblies and reuses the same cleaning solution. In particular, EnSolv® can be used in the automatic cleaning device of the invention without the risk of heating the cleaning solution to its flash point and subsequent fire. Additional advantages of using EnSolv® is the cleaning fluid comprise that it may attack the residual particulate material and buffer material left on the optical fiber after it has been stripped. Further, EnSolv® does not leave a film on the optical fiber after it has been cleaned.

It is to be appreciated that various alterations and modifications to the cleaning device and method, and the cleaning solution may be readily apparent to those of skill in the art and are intended to be within the scope of this disclosure. For example, other cleaning solutions having the same properties may be used and are intended to be within the scope of this disclosure. In addition, it has been discovered that cleaning optical fibers with the method and apparatus of the invention improves with heating of the cleaning fluid. The heating of the cleaning fluid can be done, for example, by repeated cycling and use of the cleaning device and cleaning fluid. Alternatively, the cleaning device can be provided with a heater to heat the cleaning fluid. Moreover, it is possible, for example, to use alcohol and to provide the cleaning device of the invention, for example, with a temperature sensor, and to vary the throughput rate so that there is a low probability of reaching the flash point of the alcohol.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and Figs. are by way of example only.

What is claimed is:

1. An automated cleaning device for cleaning a portion of an optical fiber, comprising:

a fluid tank assembly that holds a cleaning fluid, comprising an aperture sized and arranged to receive the portion of the optical fiber;

an ultrasonic generator, mechanically coupled to the fluid tank assembly, that, in response to a first state of a control signal, provides an ultrasonic signal to the fluid within the fluid tank assembly;

a clamping assembly adapted for holding the portion of the optical fiber along a clamping axis that is axially aligned with the aperture of the fluid tank assembly, and that is constructed and arranged to hold the portion of the optical fiber such that in a first position, the portion of the optical fiber is disposed through the aperture of the fluid tank assembly and is disposed within the fluid tank assembly, the clamping assembly comprising a sealing assembly that is constructed and arranged to form a fluid seal about the optical fiber and to form a fluid seal of the aperture of the fluid tank assembly;

a controller, responsive to a sensor signal, that provides the control signal; and a sensor that provides the sensor signal and that is mechanically coupled to the aperture of the fluid tank assembly, that senses a sealed condition for which the clamping assembly is in the fluid seal engagement with the aperture of the fluid tank assembly.

2. The cleaning device as claimed in claim 1, wherein the sensor comprises a vacuum sensor.

3. The cleaning device as claimed in claim 1, wherein the controller is adapted to activate the ultrasonic generator for a selected period of time.

4. The cleaning device as claimed in claim 3, wherein the controller is adapted to receive user input and to determine the selected period of time in response to the user input.

5. The cleaning device as claimed in claim 4, wherein the user input comprises characteristics of the optical fiber, and the controller is adapted to determine the selected period of time based upon the characteristics of the optical fiber.

6. The cleaning device as claimed in claim 1, further comprising an actuator mechanically coupled to the fluid tank assembly, that is adapted to, in response to a second state of the control signal, bias the fluid tank assembly to a first position against the clamping assembly to maintain the fluid seal engagement of the aperture of the fluid tank assembly.

7. The cleaning device as claimed in claim 6, wherein the actuator is adapted, in response to third state of the control signal, to release the fluid tank assembly from engagement with the clamping assembly.

8. The cleaning device as claimed in claim 1, further comprising a servo assembly mechanically coupled to the clamping assembly and that is adapted, in response to a second state of the control signal to move the clamping assembly along the clamping axis.

9. The cleaning device as claimed in claim 1, wherein the aperture is in a side of the fluid tank assembly and the clamping axis is horizontal.

10. The cleaning device as claimed in claim 1, wherein the fluid tank assembly comprises a first fluid level sensor electrically coupled to the controller, that senses a level of the cleaning fluid in the fluid tank assembly, and that provides the sensor signal.

11. The cleaning device as claimed in claim 10, wherein the fluid tank assembly further comprises a second fluid level sensor electrically coupled to the controller, that senses any of that the fluid tank assembly is empty or contains some cleaning fluid, and that provides the sensor signal.

12. The cleaning device as claimed in claim 1, wherein the clamping assembly further comprises first and second clamping arms rotatably supported by a base such that the first and second clamping arms can move between an open position and a closed position that holds the optical fiber along the clamping axis.

13. The cleaning device as claimed in claim 12, wherein the clamping assembly is electronically coupled to the controller and is adapted move between the open position and the closed position in response to corresponding second and third states of the control signal.

14. The cleaning device as claimed in claim 13, wherein the clamping assembly further comprises an actuator mechanically coupled to the first and second clamping arms, and electrically coupled to the controller, that is constructed and arranged to actuate the first and second clamping arms between the open and closed positions in response to the control signal.

15. The cleaning device as claimed in claim 12, wherein the first and second clamping arms comprise first and second clamping heads that are constructed and arranged to mate together in the closed position to form a fiber receptacle for the portion of the optical fiber.

16. The cleaning device as claimed in claim 15, wherein the first and second clamping heads comprise four clamping surfaces that are constructed and arranged to collectively form the fiber receptacle, and that in the open position are constructed and arranged to collectively form a radial opening that is adapted to receive the portion of the optical fiber in a radial direction relative to the clamping axis.

17. The cleaning device as claimed in claim 12, wherein the clamping assembly further comprises a fiber sensor providing the sensor signal and supported adjacent one of the first and second clamping heads, the fiber sensor being adapted to detect a presence of the portion of the optical fiber between the first and second clamping heads.

18. The cleaning device as claimed in claim 1, further comprising:

a fluid reservoir assembly that stores the cleaning fluid; and a pump fluidly coupled to the fluid reservoir assembly and to the fluid tank assembly, responsive to the control signal, that is constructed and arranged to, for one state of the control signal, pump the cleaning fluid from the fluid reservoir assembly to the fluid tank assembly.

19. The cleaning device as claimed in claim 18, wherein the pump is further constructed and arranged, in response to a second state of the control signal, to pump the cleaning fluid from the fluid tank assembly to the fluid reservoir assembly.

20. The cleaning device as claimed in claim 19, further comprising a first check valve fluidly coupled between the pump and the fluid tank assembly, that prevents the cleaning fluid from being pumped from the fluid reservoir assembly to the fluid tank assembly.

21. The cleaning device as claimed in claim 20, further comprising a second check valve fluidly disposed between the pump and the fluid reservoir assembly, that prevents the cleaning fluid from being pumped from the tank assembly to the fluid reservoir assembly.

22. The cleaning device as claimed in claim 19, further comprising a filter fluidly disposed between the pump and the fluid tank assembly, that filters the cleaning fluid that is pumped from the fluid tank assembly to the fluid reservoir assembly.

23. The cleaning device as claimed in claim 18, wherein the fluid reservoir assembly includes a fluid level sensor electrically coupled to the controller, that measures a level of the cleaning fluid in the fluid reservoir assembly, and that provides the sensor signal.

24. The cleaning device as claimed in claim 1, wherein the cleaning fluid is EnSolv® cleaning solution.

25. The cleaning device as claimed in claim 1, wherein the cleaning fluid has an auto ignition temperature of greater than or equal to substantially 12° C.

26. An automated cleaning device for cleaning a portion of an optical fiber, comprising:
   a fluid tank assembly that holds a cleaning fluid, comprising an aperture sized and arranged to receive the portion of the optical fiber;
   an ultrasonic generator, mechanically coupled to the fluid tank assembly, that, in response to a first state of a control signal, provides an ultrasonic signal to the fluid within the fluid tank assembly;
   a clamping assembly adapted for holding and positioning the portion of the optical fiber along a clamping axis that is axially aligned with the aperture of the fluid tank assembly, and that is constructed and arranged to hold the portion of the optical fiber such that in a first position the portion of the optical fiber is disposed through the aperture of the fluid tank assembly is disposed within the fluid tank assembly, the clamping assembly comprising a sealing assembly that is constructed and arranged to form a fluid seal about the optical fiber and to form a fluid seal of the aperture of the fluid tank assembly;
   a controller that provides the control signal; and
   an actuator mechanically coupled to the fluid tank assembly, that is adapted, in response to a second state of the control signal to move the fluid tank assembly to a first position against the clamping assembly to maintain the fluid seal engagement of the aperture of the fluid tank assembly.

27. An automated cleaning device for cleaning a portion of an optical fiber, comprising:
   a fluid tank assembly that holds a cleaning fluid, comprising an aperture sized and arranged to receive the portion of the optical fiber;
   an ultrasonic generator, mechanically coupled to the fluid tank assembly, that, in response to a first state of a control signal, provides an ultrasonic signal to the fluid within the fluid tank assembly;
   a clamping assembly adapted for holding and positioning the portion of the optical fiber along a clamping axis that is axially aligned with the aperture of the fluid tank assembly, and that is constructed and arranged to hold the portion of the optical fiber such that in a first position the portion of the optical fiber is disposed through the aperture of the fluid tank assembly is disposed within the fluid tank assembly, the clamping assembly comprising a sealing assembly that is constructed and arranged to form a fluid seal about the optical fiber and to form a fluid seal of the aperture of the fluid tank assembly;
   a controller that provides the control signal; and
   a servo assembly mechanically coupled to the clamping assembly and that is adapted, in response to the control signal, to move the clamping assembly along the clamping axis.

28. An automated cleaning device for cleaning a portion of an optical fiber, comprising:
   a fluid tank assembly that holds a cleaning fluid, comprising an aperture sized and arranged to receive the portion of the optical fiber;
   an ultrasonic generator, mechanically coupled to the fluid tank assembly, that, in response to a first state of a control signal, provides an ultrasonic signal to the fluid within the fluid tank assembly;
   a clamping assembly adapted for holding and positioning the portion of the optical fiber along a clamping axis that is axially aligned with the aperture of the fluid tank assembly, and that is constructed and arranged to hold the portion of the optical fiber such that in a first position the portion of the optical fiber is disposed through the aperture of the fluid tank assembly is disposed within the fluid tank assembly, the clamping assembly comprising a sealing assembly that is constructed and arranged to form a fluid seal about the optical fiber and to form a fluid seal of the aperture of the fluid tank assembly;
   a controller, responsive to a sensor signal, that provides the control signal; and
   a first fluid level sensor electrically coupled to the controller, that senses a level of the cleaning fluid in the fluid tank assembly, and that provides the sensor signal.

29. An automated cleaning device for cleaning a portion of an optical fiber, comprising:
   a fluid tank assembly that holds a cleaning fluid, comprising an aperture sized and arranged to receive the portion of the optical fiber;
   an ultrasonic generator, mechanically coupled to the fluid tank assembly, that, in response to a first state of a control signal, provides an ultrasonic signal to the fluid within the fluid tank assembly;
   a clamping assembly adapted for holding and positioning the portion of the optical fiber along a clamping axis that is axially aligned with the aperture of the fluid tank assembly, and that is constructed and arranged to hold the portion of the optical fiber such that in a first position the portion of the optical fiber is disposed through the aperture of the fluid tank assembly is disposed within the fluid tank assembly, the clamping assembly comprising a sealing assembly that is constructed and arranged to form a fluid seal about the optical fiber and to form a fluid seal of the aperture of the fluid tank assembly;

a controller that provides the control signal; and first and second clamping arms supported by a base such that the first and second clamping arms can move between an open position and a closed position that holds the optical fiber along the clamping axis.

30. An automated cleaning device for cleaning a portion of an optical fiber, comprising:

a fluid tank assembly that holds a cleaning fluid, comprising an aperture sized and arranged to receive the portion of the optical fiber;

an ultrasonic generator, mechanically coupled to the fluid tank assembly, that, in response to a first state of a control signal, provides an ultrasonic signal to the fluid within the fluid tank assembly;

a clamping assembly adapted for holding and positioning the portion of the optical fiber along a clamping axis that is axially aligned with the aperture of the fluid tank assembly, and that is constructed and arranged to hold the portion of the optical fiber such that in a first position the portion of the optical fiber is disposed through the aperture of the fluid tank assembly is disposed within the fluid tank assembly, the clamping assembly comprising a sealing assembly that is constructed and arranged to form a fluid seal about the optical fiber and to form a fluid seal of the aperture of the fluid tank assembly;

a controller that provides the control signal; and a fluid reservoir assembly that stores the cleaning fluid; and a pump fluidly coupled to the fluid reservoir assembly and to the fluid tank assembly, responsive to the control signal, that is constructed and arranged to, for one state of the control signal, pump the cleaning fluid from the fluid reservoir assembly to the fluid tank assembly.

31. An automated method for cleaning a portion of an optical fiber, comprising the steps of:

providing a fluid tank assembly that holds a cleaning fluid and comprises an aperture sized and arranged to receive the portion of the optical fiber;

holding the portion of the optical fiber along a clamping axis that is axially aligned with the aperture of the fluid tank assembly so that the portion of the optical fiber is disposed through the aperture of the fluid tank assembly and is disposed within the fluid tank assembly;

forming a fluid seal about the portion of the optical fiber and of the aperture of the fluid tank assembly;

determining a sealed condition of the fluid seal of the aperture of the fluid tank assembly; and providing an ultrasonic signal to the fluid within the fluid tank assembly to clean the portion of the optical fiber.

32. The method as claimed in claim 31, wherein the step of providing the ultrasonic signal comprises providing the ultrasonic signal for a selected period of time.

33. The method as claimed in claim 32, wherein the step of providing the ultrasonic signal further comprises determining the selected period of time based on characteristics of the optical fiber.

34. The method as claimed in claim 31, further comprising the step of moving the fluid tank assembly against the fluid seal to maintain the fluid seal of the fluid tank assembly.

35. The method as claimed in claim 34, further comprising the step of no longer biasing the fluid tank assembly against the fluid seal.

36. The method as claimed in claim 31, further comprising the step of determining a level of cleaning fluid in the fluid tank assembly.

37. The method as claimed in claim 36, wherein the step of determining further comprises determining whether the fluid tank assembly is empty.

38. The method as claimed in claim 31, wherein the step of holding comprises automatically moving first and second clamping arms between an open position and a closed position to hold the portion of the optical fiber.

39. The method as claimed in claim 38, wherein the step of automatically moving comprises mating the first and second clamping arms together to form a fiber receptacle for the portion of the optical fiber.

40. The method as claimed in claim 39, wherein the step of mating the clamping arms comprises forming a radial opening that is adapted to receive the portion of the optical fiber in a radial direction relative to the clamping axis when the clamping arms are moved to the opened position.

41. The method as claimed in claim 38, further comprising the step of sensing a presence of the portion of the optical fiber between the first and second clamping arms.

42. The method as claimed in claim 31, further comprising the step of providing a fluid reservoir assembly that stores the cleaning fluid.

43. The method as claimed in claim 42, further comprising the step of pumping the cleaning fluid from the fluid reservoir assembly to the fluid tank assembly.

44. The method as claimed in claim 3, further comprising the step of preventing the cleaning fluid from being pumped from the fluid tank assembly to the fluid reservoir assembly.

45. The method as claimed in claim 42, further comprising the step of pumping the cleaning fluid from the fluid tank assembly to the fluid reservoir assembly.

46. The method as claimed in claim 45, further comprising the step of preventing the cleaning fluid from being pumped from the fluid reservoir assembly to the fluid tank assembly.

47. The method as claimed in claim 42, further comprising the step of filtering the cleaning fluid.

48. The method as claimed in claim 42, further comprising the step of sensing a level of the cleaning fluid in the fluid reservoir assembly.

* * * * *

UNITED STATES PATENT AND TRADEMARK OFFICE
CERTIFICATE OF CORRECTION

PATENT NO. : 6,676,763 B2
DATED : January 13, 2004
INVENTOR(S) : Johnson, III et al.

It is certified that error appears in the above-identified patent and that said Letters Patent is hereby corrected as shown below:

<u>Title page,</u>
Item [73], Assignee, replace "kSaira Corporation" with -- kSARIA Corporation --.

Signed and Sealed this

Twentieth Day of April, 2004

JON W. DUDAS
*Acting Director of the United States Patent and Trademark Office*